Figure 1:
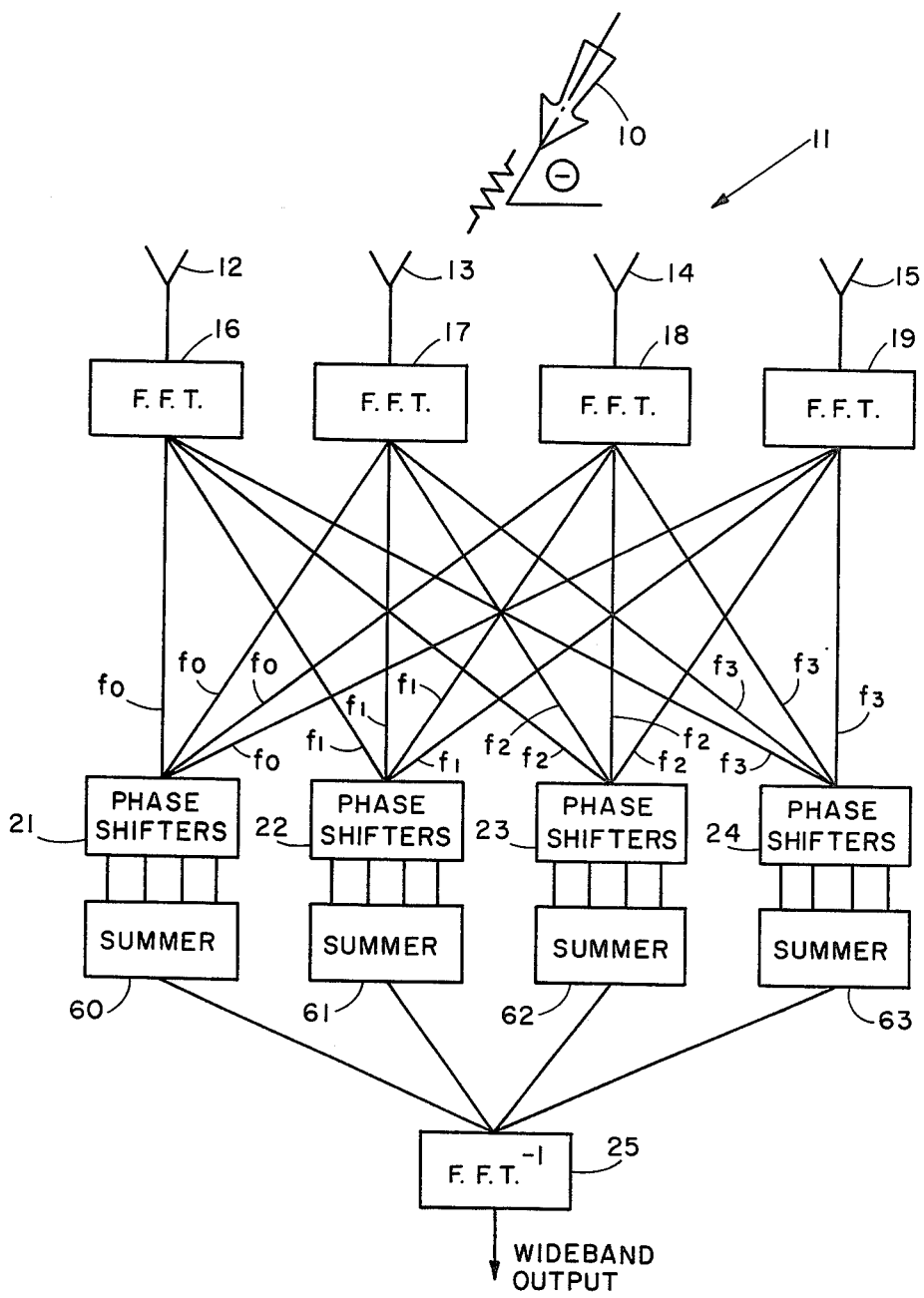

United States Patent [19]

Ladstatter

[11] 4,112,430

[45] Sep. 5, 1978

[54] BEAMFORMER FOR WIDEBAND SIGNALS

[75] Inventor: James A. Ladstatter, Baldwinsville, N.Y.

[73] Assignee: The United States of America as represented by the Secretary of the Navy, Washington, D.C.

[21] Appl. No.: 802,330

[22] Filed: Jun. 1, 1977

[51] Int. Cl.² ............................ G01S 3/74; G01S 9/66
[52] U.S. Cl. ................................ 343/100 R; 340/3 R; 340/6 R; 343/100 SA; 343/853
[58] Field of Search ................ 343/100 SA, 100 R; 340/6 R

[56] References Cited

U.S. PATENT DOCUMENTS

| 3,460,145 | 8/1969 | Johnson | 343/100 SA |
| 3,892,956 | 7/1975 | Fuss | 364/726 |
| 4,017,859 | 4/1977 | Medwin | 340/6 R X |

Primary Examiner—Malcolm F. Hubler
Assistant Examiner—Richard E. Berger
Attorney, Agent, or Firm—R. S. Sciascia; L. I. Shrago

[57] ABSTRACT

A beamformer for wideband signals wherein the elemental signals available at the sensors of a receiving array are subjected to Fast Fourier Transformations which decompose them into a plurality of narrowband signals. The narrowband signals, which consist of signals having the same Fourier coefficients, are subjected to appropriate phase shifts to form a plurality of narrowband beams having the directional characteristics desired. Reconstruction of the wideband signal is accomplished by subjecting the narrowband beams to an inverse Fast Fourier Transform. The beamforming is thus performed with narrowband signals, and only phase shift circuits are required.

12 Claims, 2 Drawing Figures

BEAMFORMER FOR WIDEBAND SIGNALS

The present invention relates generally to apparatus for and methods of forming directional receiving beams for use in radar, sonar and communication systems wherein wideband signals are encountered.

In most receiving systems which utilize a stationary array of sensors as the detecting means, the incoming signal usually impinges on the individual sensors at different times because of its arrival direction. In order for the array to produce a maximum response to the signal, it is necessary to compensate for these different arrival times before the elemental signals can be coherently summed. As is well known, the exact compensation of the dispersion in arrival time normally requires that time delays and phase shifts be imparted to these signals in accordance with well-known techniques to bring them into time coincidence.

The need of time delays, especially where the system is required to form multiple beams that are steerable and adaptive, for example, makes for a more expensive and complex system.

If the incoming signal is a pure tone CW signal, it is possible to achieve the desired coincidence of the elemental signals detected by the individual sensors of the array by merely phase shifting these signals. If the signals are digital signals, this phase shifting may be accomplished, in principle, by merely multiplying the sampled elemental values by complex steering weights. Since it is comparatively easy to change steering weights, the process of forming multiple beams and/or altering steering directions is simplified.

It has been found that even in those cases where the incoming signal is not a continuous wave signal that the beamforming operation can be realized with only phase shifts provided the bandwidth of the signal is not excessive. In this regard, the qualification is that the signal bandwidth times the maximum difference in the signal arrival time across the complete sensor array for the directions of interest be less than 0.5.

The present invention provides a method for forming and steering single and multiple wideband directional beams wherein the signal time delays and advances are realized by phase shifts and Fast Fourier Transforms (FFTs). The technique employed is to decompose the wideband signal into a plurality of narrowband signals, phase shift beamform each narrowband separately and then recombine these beams to recreate the wideband signal. Formation of the beams is accomplished without time delays. In order to decompose the wideband signals, each elemental signal is subjected to an FFT, and the bandwidth of the FFT cell is chosen to insure that the product of this bandwidth times the maximum time delay across the array satisfies the requirement that it be less than 0.5. The reconstruction of the wideband beam is achieved by subjecting the directional narrowband beams to an inverse Fast Fourier Transform (FFT$^{-1}$).

It is, accordingly, an object of the present invention to provide a method for forming directional receiving beams for wideband signals which does not require time delaying the elemental signals produced by the individual sensors of the receiving array.

It is another object of the present invention to provide apparatus for directionally receiving wideband signals which requires only phase shifting means.

Another object of the present invention is to provide a technique for beamforming wideband signals which involves decomposing the detected signal into narrowband signals, phase shift beamforming each of these narrowband signals and then reconstructing the wideband signal.

Another object of the present invention is to provide an arrangement for forming directional receiving beams which may be steered by adaptive means which utilizes the FFT in the signal processing operation.

Another object of the present invention is to provide a system for producing directional receiving beams for sonar, radar or communication systems wherein the signal time delays and advances resorted to in the beamforming are realized by phase shifters and FFTs.

Figure 2:
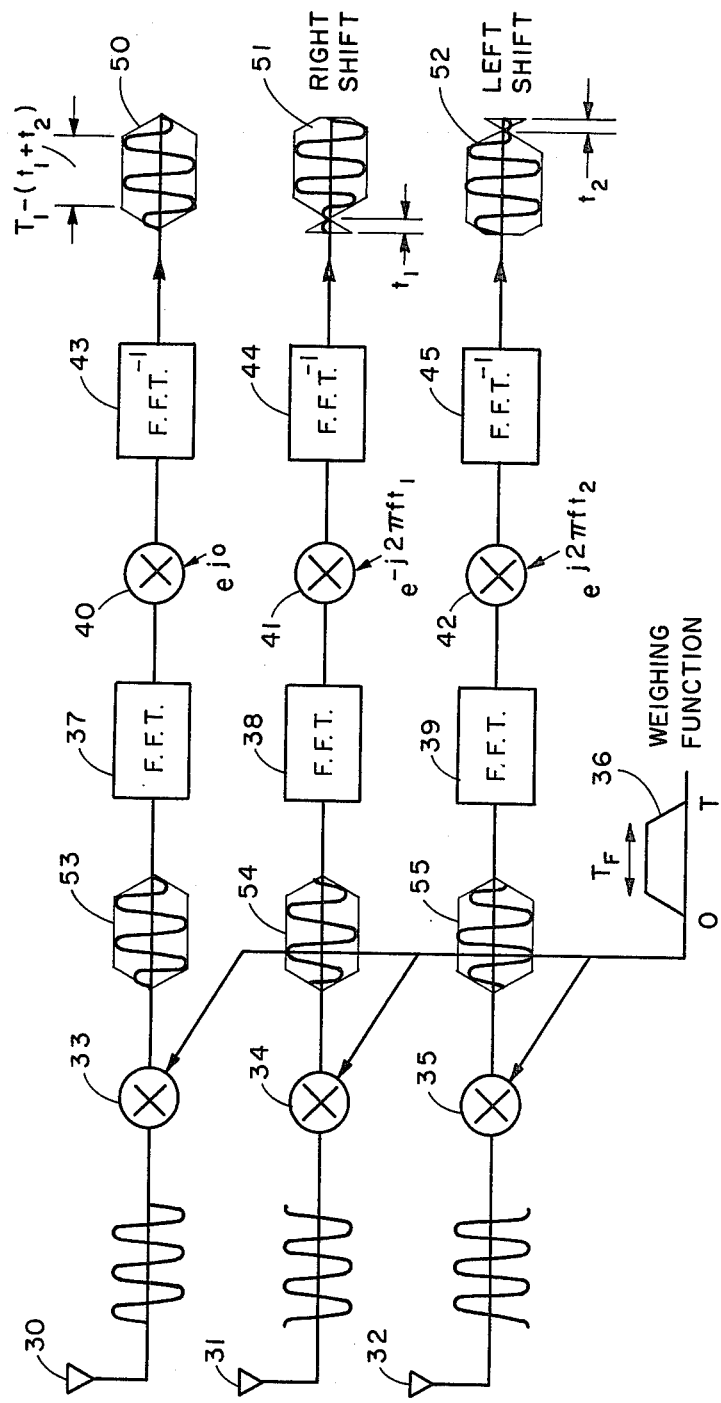

Other objects, advantages and novel features of the invention will become apparent from the following detailed description of the invention when considered in conjunction with the accompanying drawings wherein:

FIG. 1 is a block diagram of a basic system embodying the present invention; and FIG. 2 illustrates how wideband signals can be time delayed and advanced by the use of phase shifts and FFTs.

Referring now to FIG. 1 of the drawings, which is a block diagram of a simplified system embodying the present invention, an incoming wideband periodic signal, generally represented by reference character 10, which may contain radar, sonar or communication information, is shown arriving at an array 11 made up of, for example, sensors 12, 13, 14 and 15 which are here arranged in a linear, planar geometrical pattern that may be any of numerous configurations known in the prior art. Incoming signal 10 has an arrival angle $\phi$ which, in the example shown, is such that the signal impinges on the various sensors at different times.

In order for array 11 to produce maximum response to this incoming signal, as mentioned hereinbefore, it is necessary to compensate for these different arrival times, and this normally involves subjecting the elemental signal to appropriate time delays and phase shift so that they coherently add when summed.

Rather than resort to the above type of signal processing, the system of FIG. 1 feeds the elemental signal from each sensor 12, 13, 14 and 15 directly to an associated FFT circuit 16, 17, 18 and 19, respectively.

The Fourier coefficients of the elemental signal can be determined from the following equation:

$$G(k) = \sum_{n=0}^{N-1} g(n) W^{-nk} \qquad (1)$$

where
$N$ = number of time data samples
$n$ = time
$g(n)$ = value of sample at time n
$k$ = frequency
$G(k)$ = value of coefficient at frequency $k$
$W$ = exp $(j\, 2\pi/N)$ Fourier kernel
$j = \sqrt{-1}$ Thus, as the wideband input signal changes with time and successive segments of this signal, as determined by the length of the window, are subjected to the FFT, each output coefficient will correspondingly change. The frequency response of any one of the channels of the FFT, that is the transfer function, is given by the following equation:

$$|H_k(f)| = \left| \frac{\sin \pi N T_1 (f - f_k)}{\sin \pi T_1 (f - f_k)} \right| \qquad (2)$$

where $|H_k(f)|$ = amplitude response of the transfer function of the k'th channel $f_k$ = center frequency of the k'th channel = $k/NT_1$ $T_1$ = sampling time of the input signal.

This function is periodic with the period $(1/T_1)$. Each passband has a nominal width of $1/NT_1$ and the different channels have passband centers which differ in frequency by $1/NT_1$. In the operation of the system of FIG. 1, as mentioned hereinbefore, it is the product of $1/NT_1$ times the time delay across the array which must be maintained below the 0.5 figure to avoid distortion in the reconstituted wideband signal.

By performing the FFT operation repeatedly on the elemental signals available from the different sensors, it will be recognized, the successive time sequences of Fourier coefficients in frequency developed provide a plurality of narrowband signals which correspond to the component signals that comprise the wideband signal. Thus, from a different point of view, the FFTs duplicate the performance of a bank of filters having passbands spaced by $1/NT_1$ and widths of $1/NT_1$.

The narrowband outputs of each FFT, here designated $f_0, f_1, f_2, f_3$ and representing, for example, the first four Fourier coefficients obtained from a four sample process, appear in different channels and are fed directly to a series of phase shifters such as 21, 22, 23 and 24. Phase shifter 21 and its counterparts are, in fact, four distinct circuits, one for each of the $f_0$ signals appearing in the output channels of the four FFT circuits. Thus, all of the narrowband signals having the same frequency are phase shifted by different preselected amounts and summed in circuits 60, 61, 62 and 63 to form one or more narrowband directional beams having desired orientations and/or scanning motions.

All of these FFT circuits are of similar design and operate in a similar manner, to wit they receive an input signal and produce a multiplicity of output signals which correspond to the Fourier coefficients. The number of coefficients, as is well known, depends upon the number of sample points used in the FFT.

The FFT units shown in FIG. 1 may be of the type disclosed in U.S. Pat. No. 3,892,956 to P. S. Fuss which issued July 1, 1975.

The narrowband signals, after they have been phase shifted and summed to form the narrowband directional beams, are all subjected to an inverse FFT in circuit 25. This operation, in effect, reconstitutes the wideband signal.

Apparatus for performing the FFT and the inverse $FFT^{-1}$ are described in a paper entitled "Digital Matched Filters Using Fast Fourier Transforms" by H. M. Halpern and R. P. Perry in the EASCON 1971 Proceedings, pp. 220–230 published by the Institute of Electrical and Electronic Engineers, Inc.

In order to prevent distortion of the wideband beam that is produced by the system of FIG. 1, several operational requirements must be observed. In this regard, if one considers the upper path comprising of elements 30, 33, 37, 40, 43 and 50 in FIG. 2, for example, when this signal experiences a zero phase shift in phase shifter 40, the subsequent inverse FFT 43 merely undoes the results of the first FFT 37. However, if the phase shifter impresses a phase shift on this signal which is proportional to the frequency of the Fourier coefficient, when the multitude of narrowband signals is subjected to the inverse FFT, the results will be a circular shift of the input signal. This is illustrated in FIG. 2 which shows an arrangement wherein the elemental signals derived from an incoming wideband signal arriving at sensors 30, 31 and 32, are subjected to a time weighting operation with locally generated signal 36 in mixers 33, 34 and 35 prior to being subjected to the FFTs in circuits 37, 38 and 39. The reason for the time-domain weighing will be discussed hereinafter. An output from each FFT, such as f, is supplied to a second set of mixers 40, 41 and 42 which perform as phase shifters by having the signals $e^{j0}$, $e^{-j2\pi f_1}$ and $e^{j2\pi f_1}$ coupled thereto. After this linear phase shifting, with frequency completed for each FFT output, the signals experience an inverse FFT operation in circuits 43, 44 and 45, and the resulting output signals are illustrated by waveforms 50, 51 and Waveform 50, which corresponds to the case where zero phase shifting occurs in mixer 40, has no distortion, and no shift of the input signal has taken place. Waveform 51, which illustrates right circular shifting of the input signal, is delayed by $t_1$; whereas waveform 52, which illustrates left circular shifting, is advanced by $t_2$.

The distortion due to circular shifting indicates that there is a constraint between the FFT window size, the FFT overlap and the maximum time delay across the array. If FIG. 2 represents a worst case situation, then $t_1 + t_2$ equals the maximum difference in arrival time across the array, with T, the FFT window length. As seen in waveform 50, the portion of the window that does not include the end-around shifted data is $T - (t_1 + t_2)$. This is the portion of the output of the $FFT^{-1}$ which contains undistorted wideband data. Consequently, the remaining portion $(t_1 + t_2)$ of the T length $FFT^{-1}$ window must be gated off or otherwise removed. This gating off interval of data can be obtained if the sequence of operations performed in the system of FIG. 1 comprising the FFT, phase shifting and $FFT^{-1}$ is repeated often enough.

Since only a portion of the $FFT^{-1}$ output is useable, the FFT's operation should be performed on overlapping windows of data. The minimum overlap in the FFT time window is $t_1 + t_2$. Thus, for example, if the window has an eight second duration and the delay across the array is six seconds, a minimum required overlap would be 6/8 or 75 percent.

In certain applications of the beamformer, it is desirable that the narrowband FFT output channels have low sidelobe responses. The required filter shaping may be achieved by time weighting the input data before performing the FFT operations. This is accomplished in the arrangement of FIG. 2 by mixers 33, 34 and 35. However, this time domain weighting can distort the wideband beamforming data with the weighing envelope appearing on the $FFT^{-1}$ output. Multiplying this output by the reciprocal of the weighing function does not provide a solution since the position of this envelope is shifted different amounts for the different elements in the beamforming process.

The present invention solves the problem of wideband signal distortions due to time weighing of the elemental signals by using a weighing function which is flat over a specified portion of the window. In this regard, the minimum duration of the flat top portion $T_F$ is related to the FFT window duration T, the overlap OL and the maximum time delay across the array $t_1 + t_2$ by the equation:

$$T_F = T(1 - OL) + t_1 + t_2 \qquad (3)$$

Thus, in the case where T = 8 seconds, $t_1 + t_2 = 2$ seconds and OL = 3/4, TF = 4 which means, in effect, that the center half, 4/8, of the weighing function must be flat.

The sidelobe response of the FFT formed filter, it will be appreciated, can still be controlled by properly shaping the weighing function in the non-flat top portion.

What is claimed is:

1. In a method for receiving a wideband signal, the steps of detecting said wideband signal with an array of sensors; subjecting each elemental signal produced by a sensor to a Fast Fourier Transform operation,
   each FFT operation producing a plurality of output signals, with each output signal consisting of a time series of a particular Fourier coefficient;
   forming a like plurality of narrowband beams having desired directional characteristics from those output signals which correspond to the same Fourier coefficient; and
   subjecting all of said narrowband beams to an inverse FFT operation thereby to reconstitute said wideband signal.

2. In a method as defined in claim 1 wherein the step of forming the narrowband beams is accomplished with phase shifting and signal summation apparatus.

3. In a method as defined in claim 1 wherein the bandwidth of the apparatus performing the FFT operation is such that this parameter times the maximum time interval between the times of first and last detection of said wideband signal by said array is less than 0.5.

4. In a method for directionally receiving a wideband signal, the steps of
   detecting said wideband signal with an array of sensors;
   subjecting each of the elemental signals resulting from said direction to an FFT;
   imparting to the different time series of Fourier coefficients which are produced by said FFT predetermined amounts of phase shifts and summing each phase shifted series to form a plurality of narrowband beams having desired directional characteristics; and
   subjecting all of said narrowband beams to an inverse FFT thereby to reconstitute said wideband signal.

5. In an arrangement as defined in claim 4 wherein the orientation of said array with respect to the direction of said wideband signal is such that the maximum time between the impingment of said signal on the first sensor it encounters and the last sensor it encounters times the bandwidth of the apparatus which performs the FFT is less than 0.5.

6. A beamforming arrangement for receiving a wideband signal, comprising in combination
   an array of sensors each sensor producing an elemental signal in response to the impingment thereon of said wideband signal;
   means for FFTing each of said elemental signals, each FFT operation producing a plurality of time series of different Fourier coefficients;
   means for forming a narrowband beam having a desired directional characteristic from each time series that corresponds to a particular Fourier coefficient; and
   means for performing an inverse FFT on all of said narrowband beams so as to recreate said wideband signal.

7. In a method for receiving a wideband signal, the steps of detecting said wideband signal with an array of sensors;
   converting each elemental signal produced by a sensor into a multiplicity of narrowband signals,
   said narrowband signals having frequencies that correspond to different Fourier coefficients which are present in said wideband signal;
   forming a like multiplicity of narrowband directional beams from said multiplicity of narrowband signals; and
   reconstructing said wideband signal from said narrowband beams.

8. In a method as defined in claim 7 wherein said converting step is an FFT operation.

9. In a method as defined in claim 8 wherein the FFT operation is carried out on overlapping windows of wideband signal.

10. In an arrangement as defined in claim 9 wherein the bandwidth of the apparatus performing the FFT operation multiplied by the maximum time delay between the first and last detection of said wideband signal by said array is less than 0.5.

11. In a method as defined in claim 7 wherein each elemental signal produced by the array is subjected to time weighing to minimize the frequency sidelobes present in the narrowband beams.

12. In a method as defined in claim 7 wherein said reconstructing step is an inverse FFT operation.

* * * * *